Patented July 20, 1937

2,087,427

UNITED STATES PATENT OFFICE 2,087,427

METAL POLISH

Frank M. Biffen, Ridgefield Park, N. J., assignor to Foster D. Snell, Inc., Brooklyn, N. Y., a corporation of New York No Drawing. Application July 23, 1932, Serial No. 624,357

12 Claims. (Cl. 87—5)

This invention relates to a liquid non-inflammable or water-base metal polish and also to a metal polish composition suitable for making such a polish.

The demand has existed for some time for a metal polish composition which when mixed with water will readily form a stable satisfactory non-inflammable polish. In response to this demand, I have provided a highly effective liquid polish which may be prepared merely by mixing a dry composition with water. Once prepared, the improved polish is so stable that the solids will not settle out to any appreciable degree, even on long standing. Hence I have provided a metal polish answering most of the demands of the trade.

In its broadest aspects, the invention comprises a composition composed of finely divided abrasive material, soap, and an ammonium salt.

Finely divided abrasive materials of the nature of pumice, diatomaceous earth, silica, etc., have been found satisfactory. Of these, silica is preferred, which may be of an amorphous, a crystalline, or a semi-crystalline character. If the silica is of the crystalline or the semi-crystalline type, it is necessary to employ an additional suspension agent. I have discovered that colloidal suspension agents of the nature of colloidal clays such as bentonite are entirely satisfactory. The agent is incorporated in a quantity satisfactorily of from 1% to 2% of the composition by weight.

For the purpose of providing slight lubrication on the metal surface during application of the polish and for rendering less difficult the removal of the polish from the surface after drying, I have added to the composition a small quantity, satisfactorily about 0.5%, of a mineral or vegetable oil, preferably a light mineral oil of the nature of neutral oil. After use, part of the oil remains on the polished surface forming a protective film against further corrosion.

The soap used in the composition is preferably readily soluble soap of high solidifying point such as sodium and potassium stearate or sodium oleate, and may be employed in a quantity equal to about 10% to 13% of the composition, by weight.

The ammonium salts found satisfactory include, ammonium sulphate and ammonium oxalate, the latter being preferred because of its definite chemical action with respect to the removal of corrosion. About 6% or 7% by weight of the salt in the composition is sufficient.

The silica in the composition constitutes satisfactorily about 77% to 84%, by weight.

The method by which the polish is made does not constitute part of the present invention for it may be prepared in a number of ways. The only important consideration in compounding the mixture is the reduction of the silica or other abrasive material to the suspended state without leaving any lumps. As hereinbefore indicated, it is preferred to first prepare the composition in a powdered form and sell it in packages as a substantially dry powder. In order to prepare the polish, the user mixes the composition with water to dissolve the soluble constituents and to cause the solids to become suspended in the water.

In preparing the powdered composition, the abrasive material, soap, and ammonium salt, if not already in finely divided form, are ground and then thoroughly mixed, after which the mineral oil is incorporated either by slowly adding the same during constant agitation or by adding it in small quantities and allowing time for distribution between successive additions.

An alternative method of making the composition comprises intimately mixing the oil and a portion of the abrasive material, sufficient to form a paste, with the aid of a mortar and pestle or a ball mill, thoroughly mixing the balance of the abrasive and the other ingredients, and finally adding thereto the paste of oil and abrasive in small increments during constant agitation.

The soap employed should be finely powdered so that, when the water is added, all of it will go quickly into solution. If the soap does not properly dissolve, the abrasive material will often settle out.

In producing the polish from the composition, it is preferable to use warm water to facilitate the solution of the soap, the proportion of composition to water being suitably from 3 to 6 pounds to each gallon of polish. A polish prepared with 3½ pounds per gallon of polish complies with the present United States Government Navy Department specifications. It is preferable to use about 4 pounds, for in such proportion a more stable product is obtained, also having a somewhat better cutting power.

A satisfactory formula for the composition is as follows:

Silica (powdered semi-crystalline) _____ 80 lbs.
Sodium soap (powdered) _____ 13 lbs.
Neutral oil _____ ½ lb.
Ammonium sulphate _____ 6 lbs. 14 oz.
Bentonite _____ 1 lb. 6 oz.

The polish of the present invention may be produced at a low cost, for the raw materials are inexpensive and the labor necessary for compounding the same is small. The polish has a further advantage in that the silica will not settle out to the bottom of the container into a hard cake during storage and being in a substantially dry powdered form it is easier to handle and less bulky and can be made up for use in whatever amounts may be desired merely by mixing with water.

While I have described specifically, for purpose of illustration, one form of dry powder which when mixed with water will form a good metal polish it will be understood that variations may be made both in the ingredients and proportions set forth, without departing from the spirit of my invention or the scope of the appended claims.

I claim:

1. A dry powder metal polish composition consisting essentially of a water soluble ammonium salt of the group consisting of ammonium sulfate and ammonium oxalate, water soluble soap, a finely divided inorganic abrasive material, in a quantity in the neighborhood of three-fourths of the whole by weight, and a colloidal suspension agent of the nature of colloidal clay in a quantity capable of maintaining the composition in a homogeneous stable suspension in water.

2. A metal polish composition in the form of a dry powder and of such nature that, when mixed with water, a substantially homogeneous stable suspension is formed, consisting essentially of finely divided crystalline silica, in a quantity in the neighborhood of three-fourths of the whole by weight, readily soluble soap, a water soluble ammonium salt of the group consisting of ammonium oxalate and ammonium sulphate, and a colloidal suspension agent of the nature of colloidal clay in such quantity that when the composition is mixed with water the solid constituents are suspended without forming a paste, and a small quantity of neutral oil, said composition when mixed with water forming a polish which, by combined physical and chemical action and because of its substantially uniform constituency and fluidity, efficiently and economically cleans and polishes metal surfaces in general.

3. A metal polish composition in the form of a dry powder and of such nature that, when mixed with water, a substantially homogeneous stable suspension is formed, consisting essentially of finely divided crystalline silica, in a quantity in the neighborhood of three-fourths of the whole by weight, water soluble soap, ammonium oxalate, and bentonite in such quantity that when the composition is mixed with water the solid constituents are suspended without forming a paste, said composition when mixed with water forming a polish which, by combined physical and chemical action and because of its substantially uniform constituency and fluidity, efficiently and economically cleans and polishes metal surfaces in general.

4. A substantially homogeneous, stable liquid metal polish consisting of a uniform mixture with water of a composition consisting essentially of a finely divided inorganic abrasive material, in a quantity in the neighborhood of three-fourths of the whole by weight, water soluble soap, a water soluble ammonium salt of the group consisting of ammonium sulfate and ammonium oxalate, a colloidal suspension agent of the nature of colloidal clay in a quantity sufficient to hold the solid constituents in suspension without forming a paste, and a small quantity of light oil adapted to provide a lubricant, facilitate the removal of the polish and leave a film on the polished surface, said polish, by combined physical and chemical action and because of its substantially uniform consistency and fluidity being adapted to clean and polish metal surfaces in general, efficiently and economically.

5. The metal polish of claim 4 wherein the abrasive material is crystalline silica.

6. The metal polish of claim 4 wherein the ammonium salt is ammonium oxalate.

7. The metal polish of claim 4 wherein the suspension agent is bentonite.

8. A metal polish composition in the form of a dry powder and adapted to be mixed with water to form an alkaline, non-inflammable, homogeneous stable suspension, comprising by weight substantially 77% to 84% finely divided crystalline silica, 10 to 13% water soluble soap, 6 to 7% of an ammonium salt from the group consisting of ammonium oxalate and ammonium sulphate, and 1 to 2% of a colloidal suspension agent of the nature of colloidal clay, and including also a small quantity of a neutral oil.

9. A non-inflammable, substantially homogeneous and stable liquid suspension for use as a metal polish which is composed of water and, for each gallon of polish, from 3 to 6 pounds of materials consisting essentially, by weight, of 77 to 84% finely divided inorganic abrasive material, 10 to 13% water soluble soap, 6 to 7% of an ammonium salt from the group consisting of ammonium oxalate and ammonium sulphate, 1 to 2% of a colloidal suspension agent of the nature of colloidal clay and a small quantity of a light lubricating oil.

10. A substantially homogeneous alkaline liquid metal polish consisting of a uniform mixture with water of a composition consisting essentially of a finely divided inorganic abrasive material, in a quantity in the neighborhood of three-fourths of the whole by weight, water soluble soap, a water soluble ammonium salt of the group consisting of ammonium sulfate and ammonium oxalate and a colloidal suspension agent of the nature of colloidal clay in a quantity sufficient to hold the solid constituents in suspension without forming a paste.

11. A metal polish composition in the form of a dry powder and adapted to be mixed with water to form a non-inflammable, homogeneous, stable suspension comprising by weight substantially 77–84% finely divided crystalline silica, 10–13% water soluble soap, 6–7% of an ammonium salt from the group consisting of ammonium oxalate and ammonium sulfate and 1–2% of a colloidal suspension agent of the nature of colloidal clay.

12. A non-inflammable, substantially homogeneous and stable liquid suspension for use as a metal polish which is composed of water and for each gallon of polish from 3–6 pounds of materials consisting essentially by weight of 77–84% finely divided inorganic abrasive material, 10–13% water soluble soap, 6–7% of an ammonium salt from the group consisting of ammonium oxalate and ammonium sulfate and 1–2% of a colloidal suspension agent of the nature of colloidal clay.

FRANK M. BIFFEN.